US011696146B1

(12) United States Patent
Viorel et al.

(10) Patent No.: US 11,696,146 B1
(45) Date of Patent: Jul. 4, 2023

(54) SYSTEMS AND METHODS FOR WIRELESS COEXISTENCE OF OFDM TECHNOLOGIES

(71) Applicant: CABLE TELEVISION LABORATORIES, INC., Louisville, CO (US)

(72) Inventors: Dorin Gheorghe Viorel, Erie, CO (US); Joseph Padden, Boulder, CO (US); Ruoyu Sun, Westminister, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 50 days.

(21) Appl. No.: 17/314,792

(22) Filed: May 7, 2021

Related U.S. Application Data

(60) Provisional application No. 63/021,636, filed on May 7, 2020.

(51) Int. Cl.
| | |
|---|---|
| H04W 4/00 | (2018.01) |
| H04W 16/14 | (2009.01) |
| H04L 1/00 | (2006.01) |
| H04L 5/00 | (2006.01) |
| H04W 72/0453 | (2023.01) |
| H04W 72/1263 | (2023.01) |
| H04W 72/27 | (2023.01) |

(52) U.S. Cl.
CPC .......... *H04W 16/14* (2013.01); *H04L 1/0003* (2013.01); *H04L 5/0005* (2013.01); *H04W 72/0453* (2013.01); *H04W 72/1263* (2013.01); *H04W 72/27* (2023.01)

(58) Field of Classification Search
CPC .......... H04W 72/005; H04W 72/0426; H04W 72/0453; H04W 16/14
See application file for complete search history.

(56) References Cited

U.S. PATENT DOCUMENTS

| | | | |
|---|---|---|---|
| 2015/0245235 A1* | 8/2015 | Tang ................. | H04W 72/0406 370/252 |
| 2018/0343089 A1* | 11/2018 | Park ....................... | H04L 5/005 |
| 2019/0028244 A1* | 1/2019 | Si .......................... | H04W 56/00 |
| 2019/0223180 A1* | 7/2019 | Fehrenbach ...... | H04W 72/0453 |
| 2020/0092141 A1* | 3/2020 | Chen .................. | H04L 25/0204 |
| 2020/0245369 A1* | 7/2020 | Chen .................... | H04W 48/16 |

(Continued)

*Primary Examiner* — Chi H Pham
*Assistant Examiner* — Elisabeth Benoit Magloire
(74) *Attorney, Agent, or Firm* — Josh Snider

(57) ABSTRACT

A cross-scheduling resource allocation method for NOMA-based DSS is provided for a first wireless technology carrier and a different second wireless technology carrier co-existing on a same network communication channel. The method includes providing a resource subframe the first carrier within the channel at a specified bandwidth and duration, synchronizing the second wireless carrier to the specified duration within the specified bandwidth, allocating first PRBs within a first portion of the specified bandwidth for the first technology user traffic and second PRBs within a second non-overlapping portion of the specified bandwidth for the second technology user traffic, programming a frequency gap between the first PRBs and the second PRBs, obtaining channel information regarding the target communication channel, and dynamically adjusting the programmed frequency gap based on the obtained channel information.

11 Claims, 2 Drawing Sheets

(56) References Cited

U.S. PATENT DOCUMENTS

| | | | |
|---|---|---|---|
| 2020/0274671 A1* | 8/2020 | Behravan | H04L 27/0008 |
| 2021/0105107 A1* | 4/2021 | Khirallah | H04L 5/0032 |
| 2021/0289536 A1* | 9/2021 | Liu | H04W 72/14 |

* cited by examiner

SYSTEMS AND METHODS FOR WIRELESS COEXISTENCE OF OFDM TECHNOLOGIES

CROSS REFERENCE TO RELATED APPLICATIONS

This application claims the benefit of and priority to U.S. Provisional Patent Application Ser. No. 63/021,636, filed May 7, 2020, which is incorporated herein by reference in its entirety.

BACKGROUND

The field of the disclosure relates generally to management of wireless communications, and more particularly, to wireless communications utilizing multiple numerology access zones.

Conventional wireless communication systems, such as Long Term Evolution (LTE) and Worldwide Interoperability for Microwave Access (WiMAX), operate in 4G networks and utilize technologies that implement a singular numerology, that is, the combination of subcarrier spacing and symbol duration of wireless transmissions of the network. LTE, for example, supports system bandwidths up to 20 MHz with a mostly fixed orthogonal frequency-division multiplexing (OFDM) numerology having 15 kHz spacing (with some limited exceptions) between OFDM tones/subcarriers. Due to recent advances in the silicon industry, however, 5G networks allow for simultaneous multiple numerology support, that is, multiple different carrier spacings and symbol durations, which enables multiple access zones to be optimized to meet a wide range of Quality of Service (QoS) requirements and deployment scenarios.

Non-Orthogonal Multiple Access (NOMA) schemes have been recently adopted as a multiple access (MA) technique to improve the spectral efficiency of 5G, 5G New Radio (5G-NR), and 6G mobile systems, communication networks, and beyond. For the purposes of this description, these 5G+ technologies are collectively discussed further herein, according to an exemplary embodiment, as "NR" technologies, networks, and/or communications. NOMA is defined, for example, according to the 3rd Generation Partnership Project specification for Long-Term Evolution (LTE) Advanced networks (3GPP-LTE-A), including a proposed downlink implementation known as MUltiuser Superposition Transmission (MUST).

The adoption of NOMA has encouraged spectrum sharing among a higher number of users than conventional orthogonal wireless resource techniques. That is, NOMA has enabled greater capabilities to serve multiple users using the same time and frequency resources, but using different coding and/or power levels among the wireless users. NOMA operates by effectively removing orthogonality between resource blocks allocated to different users. Exemplary systems and methods for NOMA implementation are described in significantly greater detail in U.S. application Ser. No. 16/180,912, filed Nov. 5, 2018, now U.S. Pat. No. 10,523,324, issued Dec. 31, 2019, the subject matter and disclosure thereof being incorporated by reference herein in its entirety.

The initial 3GPP specifications for NOMA, however, have presented significant challenges for enabling non-standalone NR systems integrated with previous-generation networks, such as LTE. Although successful schemes have been implemented for the integration of LTE/LTE-A and NR, since both technologies utilize OFDM and orthogonal frequency division multiple access (OFDMA) communication protocols, these conventional schemes have required a significant frequency gap between the respective technology resources allocated within the same time resources of a single communication channel. This frequency gap (e.g., between coexisting LTE and NR resources) is referred to herein as the "NOMA gap." The present 3GPP specifications contemplate the NOMA gap, but do not specify how to minimize the amount of unused resources resulting from the gap, but without increasing the risk of interference between the allocated resources of the different technologies (e.g., LTE and NR) respectively separated by the NOMA gap in the frequency domain.

Conventional NR technologies are known to further implement multiple access zones having different numerologies to enable efficient transmission of different traffic types of different respective QoS requirements. In LTE, however, a 15 kHz subcarrier spacing (SCS) is fixed, and is common among all LTE user equipment devices (UEs). An innovative flexible numerology technique is described in significantly greater detail in U.S. application Ser. No. 15/787,346, filed Oct. 18, 2017, now U.S. Pat. No. 10,375,684, issued Aug. 6, 2019, the subject matter and disclosure thereof being incorporated by reference herein in its entirety.

Accordingly, it is desirable to be able to more effectively utilize the numerology support capability offered by 5G, and in particular, according to the 3GPP 5G-NR and NR specifications including NOMA, in the case where the NR technology, for example, participates in spectrum sharing with one or more other OFDM technologies (e.g., LTE) in a co-channel coexistence scenario. It is further desirable to develop new systems and methods for mitigating mutual interference between the two different technologies across the NOMA gap resulting from the spectrum sharing, and also for providing improved load balancing between the co-located communication nodes, or Base Stations (BSs), of the respective different technologies.

SUMMARY

In an embodiment, a cross-scheduling resource allocation method is provided for non-orthogonal multiple access (NOMA)-based dynamic spectrum sharing (DSS) of a first wireless carrier according to a first wireless technology protocol with a second wireless carrier according to a second wireless technology protocol. The second wireless technology protocol is different from the first wireless technology protocol, and the first and second wireless carriers co-exist on a same target communication channel of an access network. The method includes a step of providing a resource subframe, within the target communication channel, to the first wireless carrier. The resource subframe includes a specified frequency bandwidth and a specified time duration. The method further includes a step of synchronizing the second wireless carrier (i) to the specified time duration of the resource subframe, and (ii) within the specified frequency bandwidth. The method further includes a step of allocating (i) one or more first physical resource blocks (PRBs), within a first portion of the specified frequency bandwidth, for first user traffic transmitted according to the first technology protocol, and (ii) one or more second PRBs, within a second portion of the specified frequency bandwidth, for second user traffic transmitted according to the second technology protocol. The first and second portions of the specified frequency bandwidth do not overlap. The method further includes steps of programming a frequency gap between the first PRBs and the second PRBs, obtaining channel information regarding the target communication channel, and dynamically adjusting the programmed frequency gap based on the obtained channel information.

In an embodiment, a method is provided for coordinating co-channel coexistence of a first orthogonal frequency division multiplexing (OFDM) transmission sharing the same resource subframe of a wireless communication channel with a second OFDM transmission configured for non-orthogonal multiple access (NOMA) dynamic spectrum sharing (DSS). The method includes a step of defining, within a resource bandwidth of the resource subframe, a first bandwidth portion (BWP) and a second BWP that does not overlap the first BWP within the resource bandwidth. The method further includes a step of causing a first scheduling unit for the first OFDM transmission to confine the first OFDM transmission to first physical resource blocks (PRBs) allocated within the first BWP. The method further includes a step of instructing a second scheduling unit for the second OFDM transmission to allocate second PRBs for the second OFDM transmission to within the second BWP. The method further includes a step of dynamically setting a frequency gap between the first BWP and the second BWP. The frequency gap includes a gap depth indicating a difference in frequency between an outermost frequency edge of the first BWP nearest an adjacent outermost frequency edge of the second BWP. The method further includes a step of messaging the second scheduling unit to adjust the gap depth based on channel information of the wireless communication channel obtained by a communication node in operable communication with at least one of the first and second scheduling units.

BRIEF DESCRIPTION

These and other features, aspects, and advantages of the present disclosure will become better understood when the following detailed description is read with reference to the accompanying drawings in which like characters represent like parts throughout the drawings, wherein.

Figure 1:
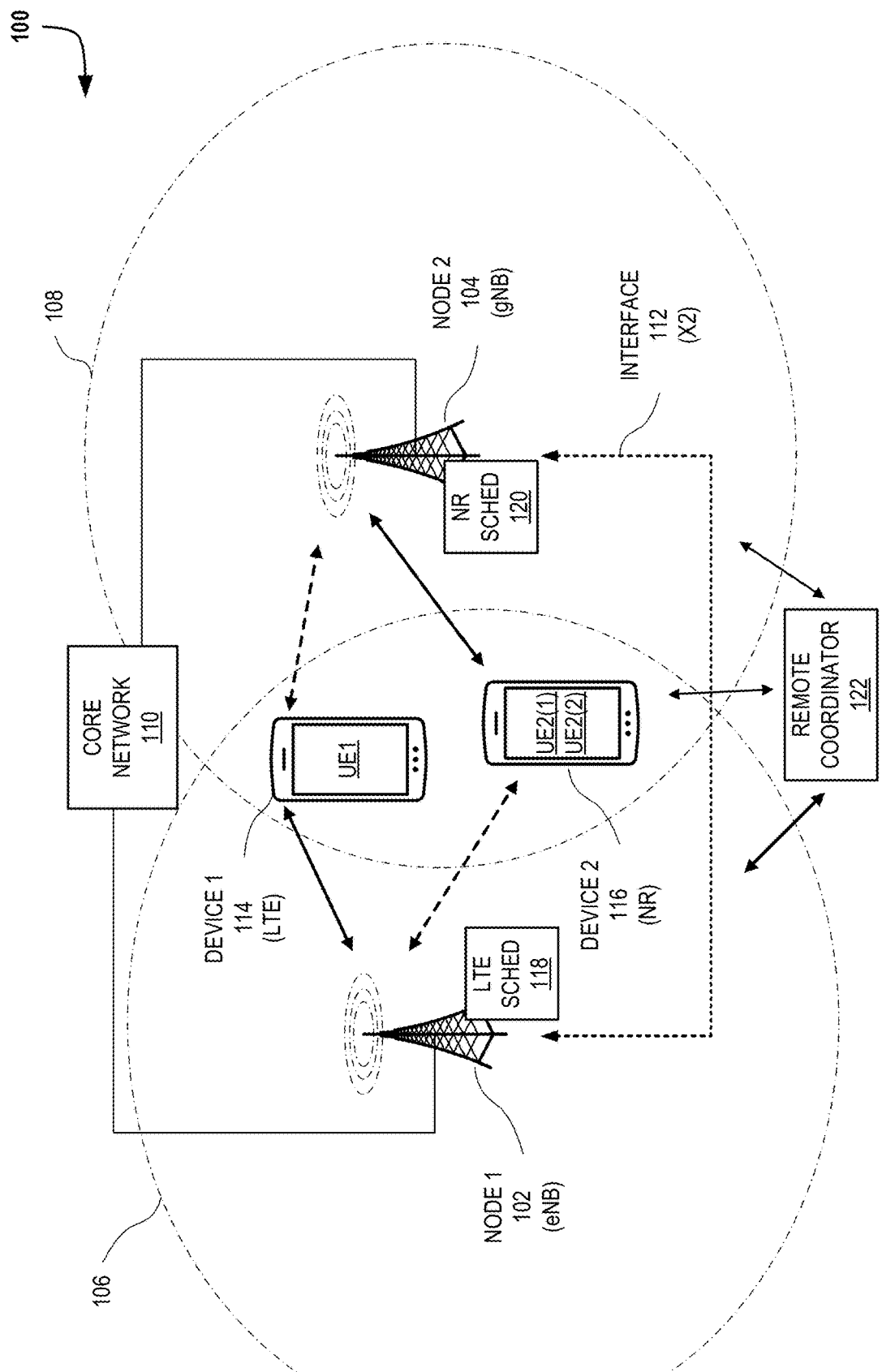
FIG. 1 is a schematic illustration of an exemplary wireless access communication system, according to an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object oriented databases, and/or another structured collection of records or data that is stored in a computer system.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, servers, and respective processing elements thereof.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

As described herein, "user equipment," or UE, refers to an electronic device or system utilizing a wireless technology protocol, for example, LTE, NR, and/or WiMAX (such as IEEE 802.16 protocols). Furthermore, "Wi-Fi device" refers to an electronic device, such as a station (or STA), that has the capability to access and implement one or more existing IEEE 802.11 protocols. For example, a UE may include, without limitation, a mobile handset or similar device configured to send/receive wireless LTE or and/or NR transmissions, and a Wi-Fi device may include, without limitation, one or more of a laptop, a desktop personal computer (PC), personal digital assistant (PDA), AP, and a Wi-Fi phone/smartphone. A UE or Wi-Fi device may be fixed, mobile, or portable, and includes a transceiver or transmitter/receiver combination. A UE or Wi-Fi device may be separate devices, or may be represented as a single device that includes media access control (MAC) and physical layer (PHY) interface that is both 802.11-conformant and 802.16-conformant to a wireless medium.

The following description relates to systems and methods for spectrum sharing between two different wireless OFDM-based technologies utilizing co-channel NOMA-based coexistence. For ease of illustration, the following description of the present systems and methods are described with respect to the exemplary scenario of spectrum sharing between NR (e.g., 5G technology and beyond) and LTE. The person of ordinary skill in the art though, will understand that the principles described herein are provided by way of example, and not in a limiting sense. The innovative systems and methods of the present embodiments may be implemented for many existing and future differing technologies sharing the same spectrum, and particularly where the two or more technologies are OFDM-based, without departing from the scope herein.

The embodiments herein advantageously provide solutions for (i) mitigating and alleviating the mutual in-band interference experienced according to conventional techniques, and (ii) load balancing for user traffic between the two coexistent access technologies (e.g., OFDM-based) through the employment of innovative cross-scheduling techniques between the coexistent access technologies.

As described herein, the present systems and methods may be implemented as stand-alone solutions, or in combination with one or more other embodiments as complementary features of a larger communication network or system. In some embodiments, individual features from the several embodiments may be implemented with respect to the prior disclosures of the present inventors apart from other features, simultaneously, and/or separately in succession, in accordance with the teachings of the present disclosure. The present systems and methods are described further below with respect to the following several drawings.

FIG. 1 is a schematic illustration of an exemplary wireless access communication system 100. In the exemplary embodiment depicted in FIG. 1, system 100 represents an integrated communication network including at least one first node 102 utilizing a first technology protocol (an E-UTRAN Node B base station for LTE communications, in this example (also referred to as an Evolved Node B, eNodeB, and/or eNB)), and at least one co-located second node 104 utilizing a different, second technology protocol (a Next Generation Node B (abbreviated as gNodeB or gNB) base station for NR communications, in this example). As described herein, the term "co-located" means that some or all of a first coverage area 106 of first node 102 overlaps with some or all of a second coverage area 108 of second node 104.

In an exemplary embodiment, first and second nodes 102, 104 are in operable communication with a common core network 110. In an alternative embodiment, first and second nodes 102, 104 operably communicate with different respective core networks (e.g., a 4G Evolved Packet Core (EPC) for eNB 102, and a 5G Core for gNB 104), which are themselves configured for operable core-to-core communication with one another. In some embodiments, first and second nodes 102, 104 are configured for direct communication with one another over a peer-to-peer logical or communication interface 112 (e.g., an X2 interface).

In exemplary operation of system 100, a first UE 114 is configured for operable wireless communications according to the first technology protocol (e.g., 4G LTE to and from first node 102), and a second UE 116 is configured for operable wireless communications according to the second technology protocol (e.g., NR to and from second node 104). That is, UEs 114, 116 may, for example, each be a mobile handset or comparable device capable of receiving a wireless communication downlink from, and transmitting a return wireless communication uplink to, the respective base station 102, 104 operating according to the same technology protocol as that UE. As discussed further below though, second UE 116 may be configured to additionally operate according to the first technology protocol of first UE 114 (e.g., a mobile handset configured for both 4G and 5G network operability).

Further to the exemplary operation of system 100, first node 102, second node 104, and core network 110 are configured to implement NOMA-based Dynamic Spectrum Sharing (DSS) with respect to first and second UEs 114, 116. In the exemplary embodiment depicted in FIG. 1, for ease of explanation, both of first UE 114 and second UE 116 are shown to be disposed at substantially equivalent distances to each of first and second nodes 102, 104, and within an overlapping region of first and second coverage areas 106, 108. Accordingly, the particular example described with respect to FIG. 1 does not address resource scheduling based on power-vs-distance considerations for NOMA implementations, namely, that of nearby UEs relative to more distant UEs. Such considerations though, are discussed further below with respect to other exemplary embodiments.

In some embodiments, either or both of first and second nodes 102, 104 a further include such conventional functional and/or programmable structural elements as a radio resource control (RRC) layer, a MAC layer, and a PHY layer (not shown in FIG. 1), and whether or both of first and second UEs 114, 116 may include similar corresponding functional and/or programmable structural elements, as well as optional hardware or software layers, such as a memory or storage unit, a packet data convergence protocol (PDCP) layer, logical channels, transport channels, and/or a processor or other programmable processing layers (also not shown in FIG. 1).

In an exemplary embodiment, first node 102 includes a first scheduler 118 disposed within, or proximate to, the relevant MAC or PHY layers thereof, and second node 104 similarly includes a second scheduler 120 within/proximate to the relevant MAC/PHY layers thereof. In further exemplary operation of system 100, first and second nodes 102, 104 utilize their relevant MAC or PHY architectures to exploit frequency gaps between different numerologies corresponding to the different technology protocols of first and second base stations 102, 104. In the exemplary embodiments described herein, the NOMA gap functions to avoid interference between the two different technology transmissions from nearby physical resource blocks (PRBs, i.e., the smallest quantity of time-frequency granted to a given user) respectively allocated to the different technology transmissions.

Implementation of NOMA thus enables system 100 to detect that transmissions to/from first UE 114 users that share the same time and frequency as transmissions to/from second UE 116 within the same DSS band. In the example depicted in FIG. 1, because both LTE and NR utilize PRBs for resource allocation, DSS may be achieved for such co-located technologies when their respective PRBs are separated across the NOMA gap. LTE PRBs though, are restricted to always using a subcarrier spacing (SBS) of 15 kHz, whereas NR PRBs are capable of scalable frequency spacing of the OFDM subcarriers according multiple numerologies. Some exemplary numerologies are shown below in Table 1.

TABLE 1

| SCS (kHz) | PRB-f (kHz) | PRB-t (ms) | Slots per Sub-frame | Sub-frame Duration (ms) |
| --- | --- | --- | --- | --- |
| 15 | 180 | 1.0 | 1 | 1 |
| 30 | 360 | 0.5 | 2 | 1 |
| 60 | 720 | 0.25 | 4 | 1 |
| 120 | 1440 | 0.125 | 8 | 1 |

Thus, in operation, when the respective first and second UEs 114, 116 are powered, turned on, or otherwise activated, the UEs synchronize, through their respective base station 102, 104, with the wireless communication technology for that UE provided by the wireless communication network of system 100 (e.g., an integrated dual-technology network, or two coordinated separate networks). First and second UEs 114, 116 may then register with system 100 according to conventional wireless UE registration means. In an exemplary embodiment, upon registration, nodes 102, 104 may be further configured to obtain channel information (e.g., channel quality indicator (CQI), signal-to-noise and interference ratio (SINR), etc.) from or regarding first and second UEs 114, 116.

From this obtained channel information, in an exemplary embodiment, DSS for the co-located LTE and NR operations they be effectively coordinated by either or both of first scheduler 118 or second scheduler 120. In some embodiments, and particularly in the case where speed of coordination is a lesser consideration, coordination of DSS between the LTE and NR transmissions may be performed remotely at core network 110, or by a separate remote coordinator 122 dedicated to optimize scheduling between the respective nodes 102, 104 of the different technologies, such as in the case where either node does not directly communicate with the same core network as the other node.

The novel embodiments described herein thus advantageously enable signal to if it can flee improved mitigation of mutual interference between two different OFDM-based technologies when dynamically sharing the same spectrum. As described further below, the present systems and methods further provide significantly improved load balancing techniques between co-located base stations implementing NOMA techniques. The present embodiments may therefore be advantageously implemented within either of the PHY architecture and MAC layer support of existing base stations without requiring significantly expensive modifications thereto. In some embodiments, the present coordinated NOMA gap optimization techniques implemented as programmable instructions (e.g., within the PHY layer), thereby even further reducing the need for costly structural upgrades to the network or individual base stations thereof.

Figure 2:
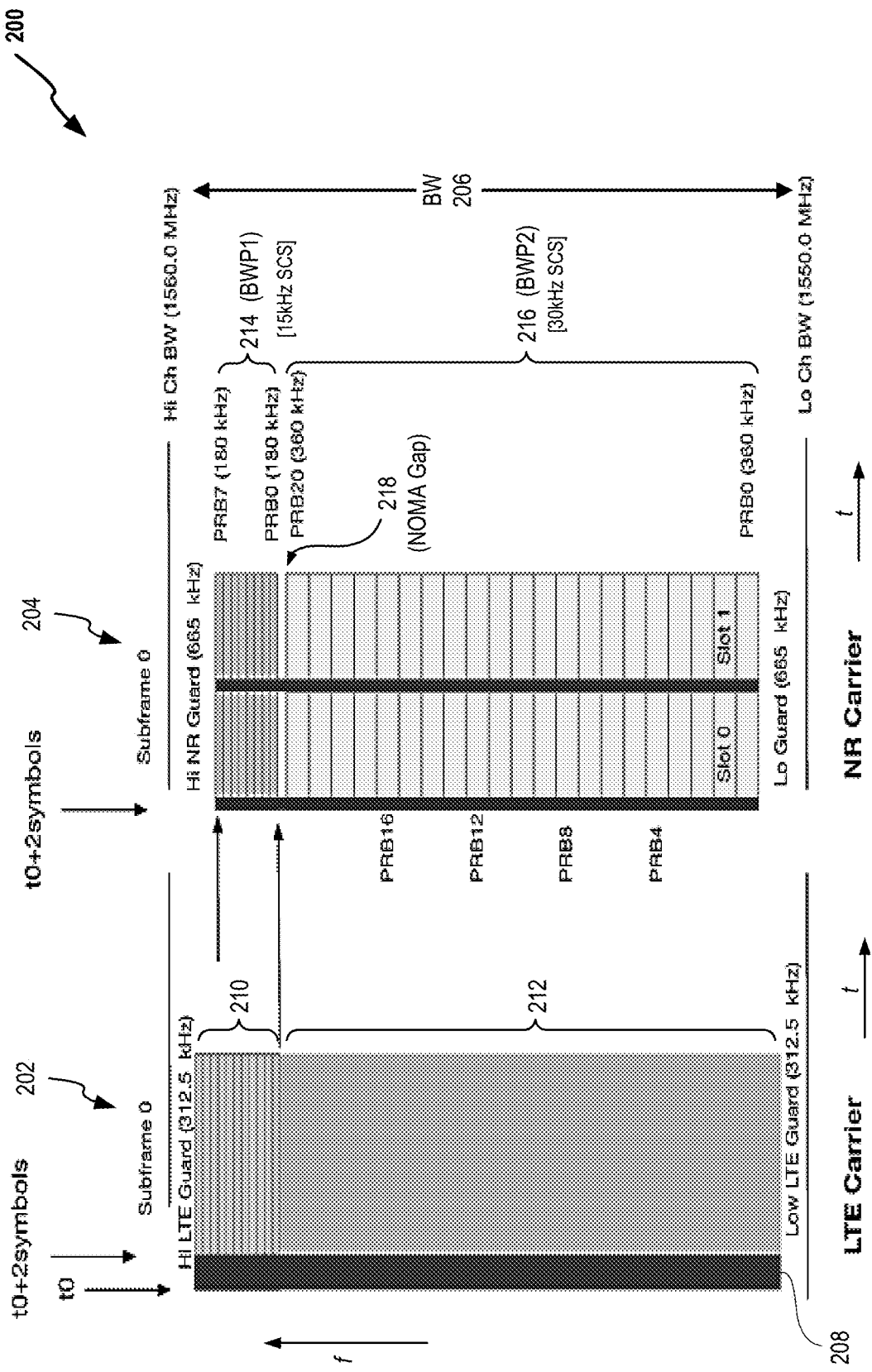
FIG. 2 illustrates an exemplary expanded view of an integrated dynamic spectrum sharing frame architecture for a wireless communication channel of the system depicted in FIG. 1.

FIG. 2 illustrates an exemplary expanded view of an integrated DSS frame architecture 200 for a wireless communication channel of system 100, FIG. 1. In an embodiment, frame architecture 200 includes a first frame structure 202 for an LTE carrier, and a second frame structure 204 for an NR carrier. In the exemplary expanded view embodiment depicted in FIG. 2, first and second frame structures 202, 204 are separately and individually depicted for ease of explanation; however, in actuality, both of first and second frame structures 202, 204 occupy the same NOMA subframe (i.e., Subframe 0, in this example) of a given duration in time (e.g., beginning at time=$t_0$), and across a particular frequency bandwidth 206.

In the exemplary embodiment, frequency bandwidth 206 is illustrated, by way of example and not in a limiting sense, as occupying the 10 MHz band between 1.55 GHz and 1.56 GHz (e.g., the n24 downlink band within the upper L-Band). The person of ordinary skill the art will understand that the present techniques are applicable to other bands where efficient coordination between different, but coexisting, OFDM technologies is desired, including the remaining FR1 spectrum below 6 GHz, as well as in the FR2 NR spectrum above 24 GHz. At present, a significant portion of 5G operation utilizes the 3.3-4.2 GHz spectrum that includes the CBRS spectrum at approximately 3.5 GHz. Additionally in this example, both of first and second frame structures 202, 204 are shown to be time-synchronized to allocate respective PRBs after the duration of the physical downlink control channel (PDCCh) 208 (e.g., having a two-symbol length, in this example), which carries the control information for the channel that enables the avoidance of interference between the primary LTE and NR resource allocations.

In an exemplary embodiment, first frame structure 202 for the LTE carrier includes an LTE user allocation portion 210 including a plurality of LTE PRBs and disposed toward the uppermost frequency range of bandwidth 206 (e.g., minus a high LTE guard interval), and a non-allocated LTE PRB portion 212 spanning the remaining lower frequency range below LTE user allocation portion 210 within bandwidth 206 (e.g., except for a low LTE guard interval), where no LTE PRBs are allocated. In the case of an LTE carrier for first frame structure 202, the plurality of PRBs within LTE user allocation portion 210 will always be allocated (e.g., by first scheduler 118, FIG. 1) at a 15 kHz SCS. Thus, the LTE scheduler is enabled to coordinate with the different technology such that only the upper portion of the channel bandwidth 206 is allocated for LTE resources, leaving the lower portion of bandwidth 206 free for NR resource allocation.

Accordingly, further to this exemplary embodiment, and for the same time-synchronized subframe of frame architecture 200, second frame structure 204 includes a first bandwidth part (BWP) 214 in the upper portion of bandwidth 206 where no NR PRBs are allocated, and a second BWP 216 in the lower portion of bandwidth 206 where a plurality of NR PRBs are allocated. In this manner, system 100 is enabled to implement NOMA-based DSS for the different LTE and NR carriers such that there is no frequency overlap between the LTE PRBs within LTE user allocation portion 210 and the NR PRBs within second BWP 216. As described above though, a NOMA gap 218 occurs between the LTE PRB(s) allocated at the lowest frequency within LTE user allocation portion 210 and the NR PRB(s) allocated at the highest frequency within second BWP 216.

In some embodiments, the bottommost frequency of second NR frame structure 204 is coordinated to align with the bottommost frequency of first LTE frame structure 202. In other embodiments, second NR frame structure 204 may be scheduled to implement a larger low guard interval between its bottommost PRB frequency and the lowest frequency of bandwidth 206.

In the exemplary embodiment depicted in FIG. 2, NR frame structure 204 is depicted as having a substantially two-slot-per-subframe numerology at a 30 kHz SCS for the allocated NR PRBs. A different SCS of 15 kHz though, is provided for non-allocated NR PRBs that overlap the allocated LTE PRBs in the frequency domain. That is, the NR scheduler (e.g., second scheduler 120, FIG. 1) is configured to coordinate the SCS of the non-allocated NR PRBs to correspond with the allocated LTE PRB SCS where the respective allocated an non-allocated PRBs share the same spectrum. Accordingly, the NOMA gap 218 represents a portion of bandwidth 206 between the respective LTE PRBs and the NR PRBs where no resources are allocated, namely, unused spectrum. The following examples thus advantageously illustrate innovative techniques for dynamically adapting the length/depth of NOMA gap 218 to minimize the amount of unused spectrum between the NR and LTE PRBs, but without unnecessarily increasing the risk of interference between the different technologies across the gap.

NOMA Allocation

As applied to the NR paradigm, the selected numerology of the NR PRBs enables dynamic adaptation of the transmitted NR waveform to the channel conditions. Conventional numerology techniques, however, only consider the channel conditions with respect to the NR transmission (e.g., smaller SCS for strong multipath, larger SCS where phase noise is high). According to the present systems and methods though, implementation of NOMA advantageously enables the network operator to dynamically adapt the NR numerology with respect to a coexisting, co-located non-NR transmission sharing the same spectrum. In an exemplary embodiment, NR PRB allocation is managed by the NR base station (e.g., second node 104, FIG. 1).

In some embodiments, second node 104 and/or second scheduler 120 is/are configured to automatically monitor and adapt the NR numerology according to detected channel conditions. In other embodiments, first node 104 and/or first scheduler 118 is/are configured to automatically monitor the channel conditions and instruct second node 104 to adjust the applied NR numerology with respect to one or more NR PRBs. In at least one embodiment, second node 104 adjusts the numerology of the NR PRBs based on real-time instructions from core network 110 or remote coordinator 122.

Referring back to both of FIGS. 1 and 2, in exemplary operation of system 100 with regard to the same subframe of frame architecture 200, upon activation and registration of first and second UEs 114, 116 with system 100 (i.e., through first and second nodes 102, 104), second NR node 104 is configured to establish a NOMA allocation for NR frame structure 204. Thus, in the exemplary embodiment depicted in FIG. 2, because the non-NR technology is LTE, the LTE scheduler (e.g., first scheduler 118) is enabled to allocate only the upper portion (e.g., LTE user allocation portion 210) of the channel bandwidth (e.g., bandwidth 206) such that the SCS is 15 kHz for the allocated LTE PRBs (fixed value under present 3GPP specifications for 4G LTE, and the NR scheduler (e.g., second scheduler 120) time synchronizes NR frame structure 204 with LTE frame structure 202.

Upon time synchronization, the NR scheduler further aligns the bottommost frequency of first BWP 214 (i.e., non-allocated NR user BRBs) with the bottommost frequency of allocated LTE PRBs of LTE user allocation portion 210, and utilizes a first numerology for first BWP 214 having an SCS corresponding to the overlapping allocated LTE PRBs (15 kHz SCS, in this example). The NR scheduler is further configured to then utilize a second, different numerology for the NR PRBs allocated in second BWP 216 (initially, a 30 kHz SCS, in this example). In the exemplary embodiment depicted in FIG. 2, NOMA gap 218 is disposed between the first and second numerologies of first and second BWPs 214, 216, respectively.

As described with respect to the following examples, the NR scheduler is further configured to (1) dynamically adjust, and potentially remove, the NOMA gap according to dynamic channel conditions, and/or (2) selectively adjust the numerology of some allocated NR PRBs within second BWP 216 to be different from the numerology of other allocated NR PRBs within second BWP 216. These innovative capabilities are particularly useful in the case where a particular UE (e.g., second UE 116) is configured for more than one access technology, for example, a mobile cellular device capable of accessing both of a 4G and a 5G mobile network, and/or in the case where the respective frequency bands of the accessed 4G/5G networks vary.

Programmable NOMA Gap

The following examples are therefore described, for illustrative purposes and not in a limiting sense, with respect to defined LTE and NR frequency bands. Based on this assumption, the NR scheduler may be further configured such that NOMA gap 218 has a programmable length/depth, i.e., a number of subcarriers defining the gap size (e.g., 0-N subcarriers). In exemplary operation, the NR scheduler is further configured to dynamically adjust the programmable length/depth of NOMA gap in response to detected channel conditions, and/or instructions from first LTE node 102 (e.g., over an X2 interface), core network 110, or remote coordinator 122.

In an exemplary embodiment, the NR scheduler schedules the depth of NOMA gap 218 synchronously with the Modulation and Coding Rate (MCS) of neighboring NR PRBs. For example, in some embodiments, the NR scheduler may schedule the NR PRBs proximate to NOMA gap 218 (i.e., in frequency) with a lower MCS than other NR PRBs, such as in the case where a smaller NOMA gap is desired. In some instances, the NR scheduler may utilize a lookup table to enable the selection of a particular MCS for a particular NR PRB. In at least one embodiment, the NR scheduler selects the MCS for one or more PRBs based, at least in part, on the relative distance of the target UE from the cell edge (e.g., outer boundary of second coverage area 108).

Dynamic Load Balancing

In some embodiments, because the relative loads of LTE and NR users within system 100 may be different, the NR scheduler may be further configured to dynamically schedule load targeting of the respective LTE and NR UEs (e.g., first and second UEs 114, 116). That is, system 100 may be configured to dynamically schedule the number of PHY resources, such as respective PRBs and subcarriers, the LTE eNB (e.g., first node 102) and the NR gNB (e.g., second node 104). In an exemplary embodiment, the cross scheduling of resources between the eNB and gNB may be controlled or managed by core network 110 (or remote coordinator 122, if applicable).

Alternatively, the resource cross scheduling may be managed by either or both of the eNB and gNB, i.e., in direct communication with one another over communication interface 112 (e.g., an X2 interface). In at least one embodiment, the relevant supporting signaling messages may be transmitted to the eNB and gNB over common core network interfaces. In some instances, dedicated signaling messages may be utilized to enable the cross scheduling and node-to-node coordination. In other instances, the relevant signaling information may be included within existing conventional signaling messages, where possible.

NOMA Gap Optimization

In the exemplary embodiment depicted in FIG. 1, first and second nodes 102, 104 are illustrated as being potentially distant from one another, and also with respect to UEs 114, 116. In many instances though, and particularly more often as 5G NR networks continue to expand, first LTE node 102 and second NR node 104 may be co-located proximate one another and/or have a substantially close cell center (i.e., first and second coverage areas 106, 108 have their respective cell centers at substantially the same location). In such instances, the respective locations of first and second UEs 114, 116 relative to this common cell center may be considered.

The following illustrative exemplary case scenarios are therefore described with respect to Table 2, below. For Table 2, the index of transport block size (TBS) is represented as $I_{TBS}$, and $n_{PRB}$ indicates a resource block within a specific carrier BWP (i.e., first or second BWPs 214, 216, FIG. 2).

TABLE 2

| $I_{TBS}$ | $n_{PRB}$ = 7 | 1 PRB Gap Efficiency Loss | No Gap, Drop I_tbs Efficiency Loss | $n_{PRB}$ = 8 |
|---|---|---|---|---|
| 0 | 176 | 15.38% | 7.14% | 208 |
| 1 | 224 | 12.50% | 13.51% | 256 |
| 2 | 296 | 9.76% | 16.33% | 328 |
| 3 | 392 | 10.91% | 9.84% | 440 |
| 4 | 488 | 11.59% | 8.00% | 552 |
| 5 | 600 | 11.76% | 4.49% | 680 |
| 6 | 712 | 11.88% | 3.81% | 808 |
| 7 | 840 | 13.22% | 0.00% | 968 |
| 8 | 968 | 11.68% | 0.00% | 1096 |
| 9 | 1096 | 12.74% | −2.61% | 1256 |
| 10 | 1224 | 11.56% | 0.00% | 1384 |
| 11 | 1384 | 13.93% | 0.00% | 1608 |
| 12 | 1608 | 10.67% | 0.00% | 1800 |
| 13 | 1800 | 11.07% | −1.61% | 2024 |
| 14 | 1992 | 12.63% | −5.95% | 2280 |
| 15 | 2152 | 12.94% | −8.42% | 2472 |
| 16 | 2280 | 12.31% | −2.52% | 2600 |
| 17 | 2536 | 11.20% | −2.29% | 2856 |
| 18 | 2792 | 10.28% | −4.29% | 3112 |
| 19 | 2984 | 14.65% | −7.90% | 3496 |
| 20 | 3240 | 13.65% | −7.32% | 3752 |
| 21 | 3496 | 12.77% | −6.82% | 4008 |
| 22 | 3752 | 12.01% | −6.39% | 4264 |
| 23 | 4008 | 12.57% | −7.50% | 4584 |
| 24 | 4264 | 14.17% | −13.11% | 4968 |
| 25 | 4392 | | | 5160 |

In consideration of the data shown in Table 2, in a first exemplary NOMA gap case scenario, first LTE UE 114 and second NR UE 116 may both be located at or substantially near the cell center (e.g., which may be determined by either or both of first and second nodes 102, 104). This first exemplary case scenario thus represents a high-SINR condition. Under this condition, a determination may be made that there is no need to change the MCS of the PRBs, and that NOMA gap 218 may be reduced to zero (i.e., effectively no gap) to maximize channel spectral efficiency. In this exemplary scenario, it may be further determined that there will be no substantial efficiency loss resulting from the elimination of NOMA gap 218, and the relevant receiver(s) may thus absorb a slightly lower SINR.

In a second exemplary NOMA gap case scenario, first LTE UE 114 may be located at the cell edge, and second NR UE 116 is located at the cell center. In this second exemplary NOMA gap case scenario, the location of first LTE UE 114 at the cell edge represents a lower-SINR condition relative to second UE 116 at the cell center. Under this condition, the determination regarding NOMA gap 218 may be similar to the determination made in the first exemplary case scenario described above, namely, that no gap is needed to maximize channel spectral efficiency. Different though, than the first exemplary case scenario, in this scenario, a further determination may be made to reduce the index $I_{TBS}$ for first LTE UE 114 by 1, that is, relative to an $I_{TBS}$ value that is based solely on CQI/SINR requirements (e.g., initial channel conditions).

In this second exemplary NOMA gap case scenario, no change to the index $I_{TBS}$ value for second NR UE 116 may be necessary. Thus, according to the dynamic determinations made by or for the NR scheduler, the channel spectral efficiency may be maximized, while either increasing the spectral efficiency gain, or at least reducing the spectral efficiency loss. That is, as shown in Table 2, for $I_{TBS}$ index values of 12 or less, the efficiency loss is reduced; for $I_{TBS}$ index values of 13 or greater, an efficiency gain is realized relative to 1 PRB gap having an $I_{TBS}$ index value that is 1 greater.

In a third exemplary NOMA gap case scenario, both of first LTE UE 114 and second NR UE 116 may be located at the cell edge. Under these conditions of this third exemplary NOMA gap case scenario, a determination may be made to program or adjust NOMA gap 218 to have a length/depth corresponding to at least one neighboring PRB. In this case, the NR scheduler may be further configured (or instructed) to match the particular CQI/SINR requirements. According to these exemplary dynamic determinations, system 100 is enabled to advantageously maximize both the available SINR budget and the cell coverage of the respective first and second Load Balance Optimization In further consideration of Table 2, above, the novel systems and methods provided herein may be further implemented to advantageously improve the load balancing between co-located wireless networks utilizing DSS to integrate their respective transmissions utilizing differing technologies. The following exemplary load balancing case scenarios are described, by way of example and not in a limiting sense, with respect to first UE 114 being configured for LTE operation only (e.g., a 4G handset), and second UE 116 being dually configured for both LTE and NR operation (e.g., a 4G/5G handset). The following exemplary load balancing case scenarios are further described with respect to (i) enhanced mobile broadband (eMBB) traffic, which was introduced for the 4G/LTE paradigm, but increasingly implemented in the 5G/NR paradigm, and/or (ii) ultra reliable and low latency communication (URLLC) traffic, which was introduced in the 5G/NR paradigm.

In a first exemplary load balancing case scenario, first LTE UE 114 and second NR/LTE UE 116 may both have eMBB traffic pending delivery in a receiver buffer (e.g., user data stored in a user-specific transmission buffer of the network pending delivery to the respective UE). Under this scenario, a scheduling determination may be made to schedule both first and second UE 114, 116 on the LTE carrier (e.g., LTE frame structure 202, FIG. 2), that is, NOMA gap 218 may be removed due to the lack of cross-technology interference. In this first exemplary load balancing case scenario, by scheduling only the LTE carrier, no significant efficiency loss will occur, no adjustments to the index $I_{TBS}$ are necessary, and channel spectral efficiency may be maximized without the need to implement NOMA.

In a second exemplary load balancing case scenario, second UE 116 is a plurality of dually-configured NR/LTE UEs (two dually-configured NR/LTE UEs 116(1) and 116(2), in this example). Accordingly, in this second exemplary load balancing case scenario, all of LTE UE 114 and NR/LTE UEs 116(1), 116(2) may have eMBB traffic pending delivery in the buffer. Under this scenario, a scheduling determination may be made to schedule: (1) each of LTE UE 114, NR/LTE UE 116(1), and NR/LTE UE 116(2) in its own respective transmission time interval (TTI); (2) LTE UE 114 and NR/LTE UE 116(1) in a first TTI (e.g., $TTI_x$) of the LTE carrier, and NR/LTE UE 116(2) in second TTI (e.g., $TTI_{x\pm1}$), but of the NR carrier (e.g., NR frame structure 204, FIG. 2); or (3) LTE UE 114 in LTE carrier $TTI_x$, and both of NR/LTE UEs 116(1), 116(2) in NR $TTI_{x\pm1}$.

In this second exemplary load balancing case scenario, because the latency introduced by the additional one or two TTIs will have no substantial impact on eMBB, no significant efficiency loss is expected to occur, no adjustments to the index $I_{TB}S$ are necessary, and channel spectral efficiency may be maximized. It may be noted here that, under this exemplary second load balancing case scenario, the LTE-only UE (i.e., LTE UE 114) remains scheduled in the LTE carrier, whereas the dually-configured NR/LTE UEs (i.e., NR/LTE UEs 116(1), 116(2)) enable the optional and dynamic selection of either the LTE carrier or the NR carrier for eMBB traffic.

In a third exemplary load balancing case scenario, second UE 116 is again described as two dually-configured NR/LTE UEs 116(1) and 116(2), but in this scenario LTE UE 114 and NR/LTE UE 116(1) have eMBB traffic pending delivery in the buffer, whereas NR/LTE UE 116(2) has URLLC traffic pending. Under this scenario, an exemplary scheduling determination may be made to schedule both of NR/LTE UEs 116(1), 116(2) in NR $TTI_x$, and LTE UE 114 in LTE $TTI_{x\pm1}$. For this exemplary scheduling determination, (i) NR/LTE UE 116(2), which has pending URLLC traffic, will be scheduled in the NR carrier, (ii) LTE-only UE 114 will be scheduled in the LTE carrier, and (iii) NR/LTE UE 116(1), which has pending eMBB traffic, may be optionally scheduled in either the LTE carrier or the NR carrier. Accordingly, a NOMA gap is not needed to mitigate interference between the dually-configured devices, and no adjustments to the index $I_{TBS}$ are necessary with respect to the NR TTI scheduling for NR/LTE UEs 116(1), 116(2).

With respect to the LTE TTI scheduling for LTE-only UE 114 though, LTE UE 114 may be scheduled on the LTE carrier having a gap of at least 1 PRB in $TTI_{x\pm1}$, which may further include a repeating pattern. Alternatively, LTE-only UE 114 may be scheduled on the LTE carrier without implementing a NOMA gap, but instead adjusting (e.g., dropping) the index $I_{TBS}$ B in $TTI_{x\pm1}$, which may again include a repeating pattern.

In this third exemplary load balancing case scenario, it may be noted, the LTE-only UE again remains scheduled in the LTE carrier, whereas the URLLC traffic of the dually-configured NR/LTE UE(s) is scheduled in the NR carrier. According to this third exemplary load balancing case scenario, some efficiency loss may expected, but the URLLC traffic will be maintained for the NR-enabled UEs while the spectrum is shared with LTE traffic. It is contemplated that the efficiency loss experienced in the case where the LTE-only UE is scheduled with a PRB gap in $TTI_{x\pm1}$ may be greater than the efficiency loss experienced in the alternative case where the LTE UE is scheduled with a drop in the index $I_{TBS}$ B in $TTI_{x\pm1}$.

According to the innovative systems and methods described herein, both time and frequency alignment of differing OFDM technologies (e.g., between NR/5G and LTE/4G) may be dynamically achieved. Conventional DSS techniques, for example, only synchronize integrated DSS LTE/NR frames with respect to time, but not with respect to frequency. In these conventional schemes, the frequencies are merely separated (by a gap) within a shared frame structure, but without dynamic cross-scheduling between the two differing technologies. According to the present embodiments though, the frequency gap (e.g., the NOMA gap) between allocated LTE and NR PRBs in the same frame structure may be programmable and/or dynamically adjustable by active coordination and cross-scheduling between the respective nodes (e.g., eNBs and gNBs) of the differing OFDM technologies sharing the same spectrum.

According to the exemplary embodiments described herein, the dynamic cross-scheduling messaging, as well as the related gap adjustment and load balancing determinations, may be configured locally in a scheduling or coordination module/processor of either of the eNB or gNB base station, or remotely by the core network (or a separate dedicated coordinator). The dynamic adjustments resulting from these determinations though, will be made by the NR/NOMA-configured gNB.

According to the systems and methods described herein, mobile devices in the vicinity of co-located eNBs and gNBs are advantageously enabled to transition from an LTE carrier to an NR carrier within the same channel, which is particularly valuable in the case of dually-configured NR/LTE UEs capable of receiving both LTE and NR traffic.

The present systems and methods thus introduce an innovative dynamically adjustable and/or programmable gap, i.e., the NOMA gap, between the respective NOMA allocations of PRBs across the NOMA gap. Through the novel cross-scheduling techniques herein, this NOMA gap may be dynamically adjusted to optimize the potential trade-off between unused bandwidth in the gap, on the one hand, and the coverage resulting from higher/lower MCS for the NR PRBs, on the other hand. According to the present embodiments, the gNB may determine, or be signaled to assign, a lower MCS to PRBs neighboring (e.g., immediately adjacent or generally proximate) the NOMA gap. By selectively adjusting the MCS of neighboring PRBs, but assigning a different MCS to more distant (in frequency) PRBs within the same subframe, the present systems and methods mitigate the potential interference between the LTE and NR carriers, but while maximizing the spectral efficiency of the allocations by minimizing the length/depth of the NOMA gap according to the dynamic conditions of the channel. For example, a lower MCS may be allocated to the PRBs neighboring the NOMA gap, and a higher MCS allocated to the more distant, outer PRBs, such as in the case where the respective nodes seek to target center- or mid-cell coverage.

Exemplary embodiments of systems and methods for coordinating and integrating coexisting different transmission technologies are described above in detail. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A cross-scheduling resource allocation method for non-orthogonal multiple access (NOMA)-based dynamic spectrum sharing (DSS) of a first wireless carrier according to a first wireless technology protocol with a second wireless carrier according to a second wireless technology protocol, the second wireless technology protocol being different from the first wireless technology protocol, and the first and second wireless carriers co-existing on a same target communication channel of an access network, the method comprising the steps of:

providing a resource subframe, within the target communication channel, to the first wireless carrier, wherein the resource subframe includes a specified frequency bandwidth and a specified time duration;

synchronizing the second wireless carrier (i) to the specified time duration of the resource subframe, and (ii) within the specified frequency bandwidth;

allocating (i) one or more first physical resource blocks (PRBs), within a first portion of the specified frequency bandwidth, for first user traffic transmitted according to the first technology protocol, and (ii) one or more second PRBs, within a second portion of the specified frequency bandwidth, for second user traffic transmitted according to the second technology protocol, wherein the first and second portions of the specified frequency bandwidth do not overlap;

programming a frequency gap between the first PRBs and the second PRBs;

obtaining channel information regarding the target communication channel; and dynamically adjusting the programmed frequency gap based on the obtained channel information.

2. The method of claim 1, wherein the channel information includes one or more of a channel quality indicator (COI) and a signal-to-noise and interference ratio (SINR) for at least one of the first user traffic and the second user traffic.

3. The method of claim 1, wherein the first technology protocol is a long-term evolution (LTE) communication protocol, and wherein the second technology protocol is a new radio (NR) communication protocol.

4. The method of claim 3, wherein the first wireless carrier is an LTE carrier, and wherein the second wireless carrier is an NR carrier.

5. The method of claim 4, further comprising a step of assigning (i) a first subcarrier spacing (SOS) to the first PRBs allocated to the LTE carrier, and (ii) a second SOS to the second PRBs allocated to the NR carrier.

6. The method of claim 5, wherein the first SOS is 15 kHz, and wherein the second SCS is greater than 15 kHz.

7. The method of claim 6, wherein the second SCS is at least 30 kHz.

8. The method of claim 4, further comprising a step of selecting (i) a first modulation coding scheme (MCS) to at least one second PRB proximate the frequency gap in the frequency domain, and (ii) a second MOS to a different second PRB within the second portion of the specified frequency bandwidth more distant from the frequency gap than the at least one second PRB in the frequency domain.

9. The method of claim 8, wherein the frequency gap is dynamically adjusted based at least in part on the selected first MOS and second MCS.

10. The method of claim 8, wherein the first MOS and second MCS are selected based on a predetermined size of the frequency gap.

11. The method of claim 8, wherein the first MCS and second MCS are selected using a lookup table.

\* \* \* \* \*